(No Model.)　　　　　　　　　　　　　　　　2 Sheets—Sheet 1.
J. L. MOTT, Jr.
CISTERN FOR WATER CLOSETS.
No. 397,659.　　　　　　　　　　Patented Feb. 12, 1889.

Witnesses:
Chas H Smith
J. Stail

Inventor:
Jordan L. Mott Jr.
Lemuel W. Serrell
Atty (No Model.)  J. L. MOTT, Jr.  2 Sheets—Sheet 2.
CISTERN FOR WATER CLOSETS.
No. 397,659.  Patented Feb. 12, 1889.
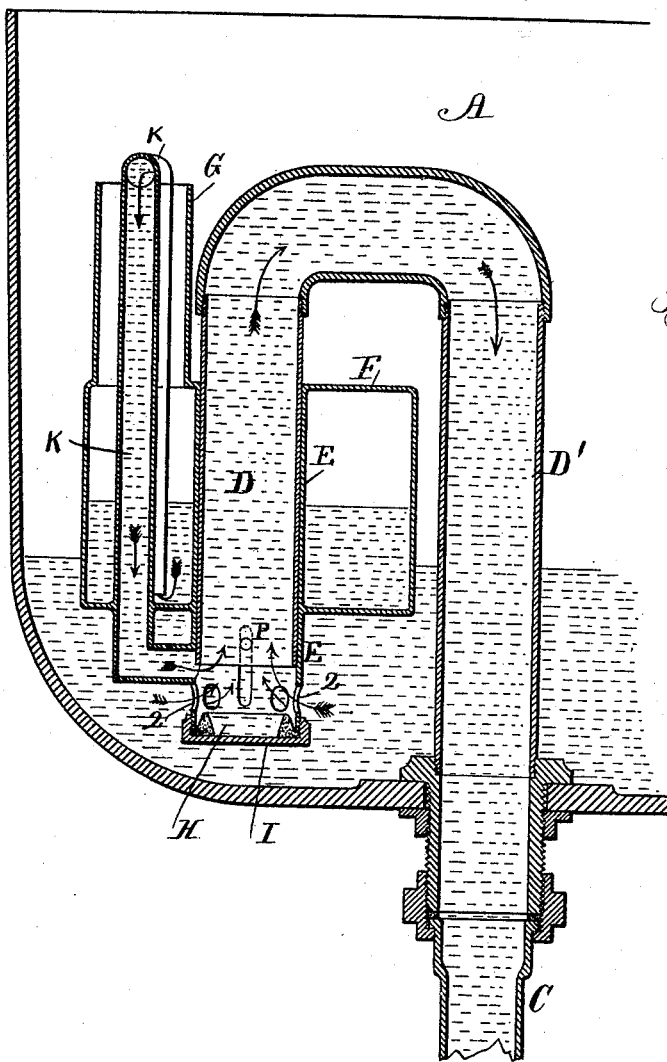

UNITED STATES PATENT OFFICE.

JORDAN L. MOTT, JR., OF NEW YORK, N. Y., ASSIGNOR TO THE J. L. MOTT IRON WORKS, OF SAME PLACE.

CISTERN FOR WATER-CLOSETS.

SPECIFICATION forming part of Letters Patent No. 397,659, dated February 12, 1889.

Application filed August 16, 1888. Serial No. 282,852. (No model.)

*To all whom it may concern:*

Be it known that I, JORDAN L. MOTT, Jr., of the city and State of New York, have invented an Improvement in Cisterns for Water-Closets, of which the following is a specification.

Cisterns have been constructed in which the water is allowed to flow in continually in a small stream, and the discharge therefrom is periodical by the action of the float and valve. My present improvement is to accomplish the same object in a very reliable manner by the action of a siphon and float.

In my present improvement the water rises within the cistern and lifts the float, and this closes the inlet to the siphon until the water rises above the siphon and finally overflows into the float, filling the said float and causing it to drop suddenly, so as to open the inlet to the siphon, and the siphon fills and continues to discharge the water from the cistern and flush the water-closet until the water descends below the open end of the siphon and air passes thereinto, stopping the siphon action; and there is within the float a small secondary siphon, which is filled by being submerged at the time the float descends, and as the water is drawn out of the cistern by the main siphon this secondary siphon commences to run and continues to operate until the water is removed from the float, so that said float will again rise by the accumulation of water in the closet-cistern.

Figure 1:
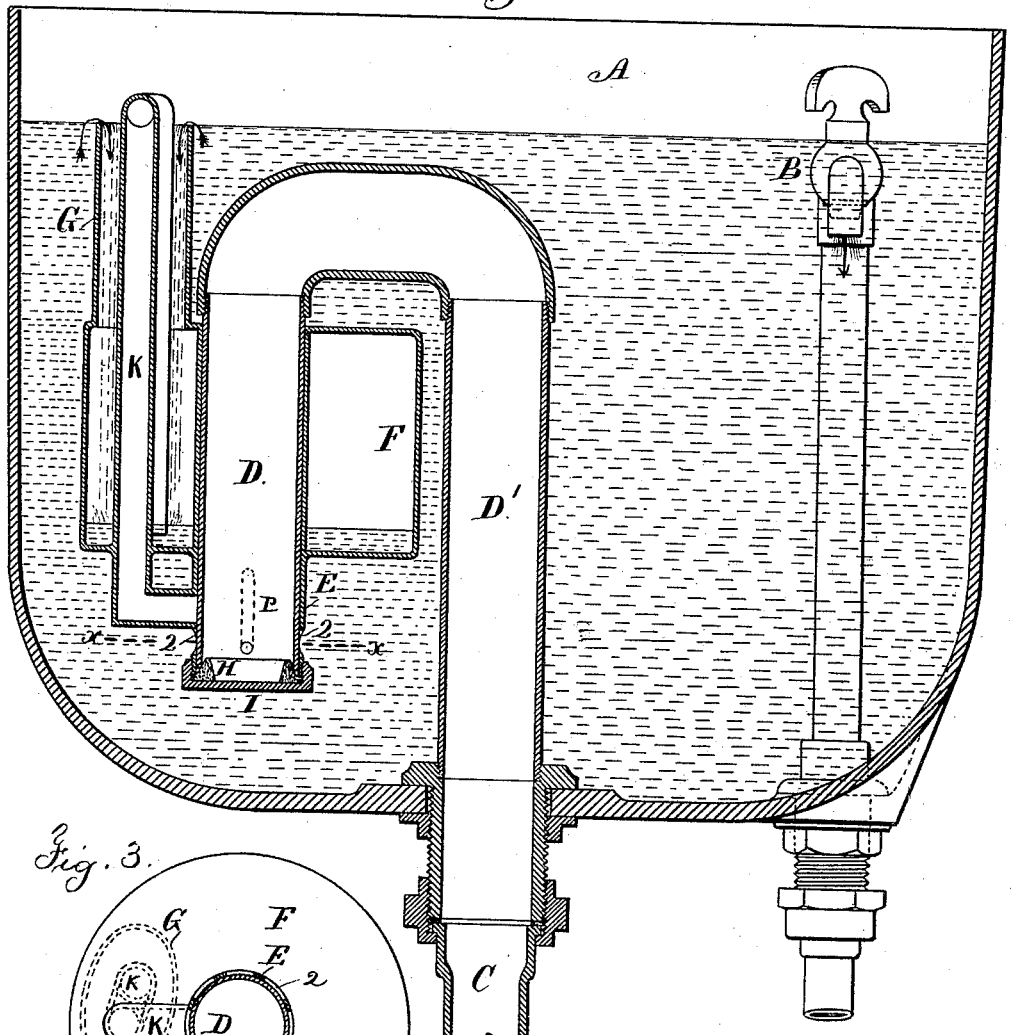
Figure 3:
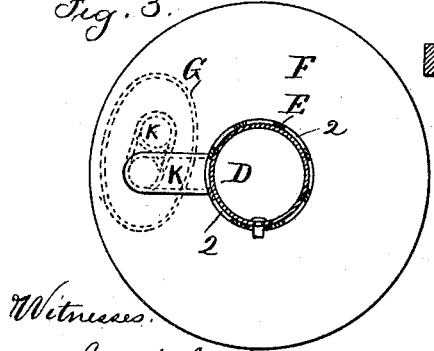

In the drawings, Figure 1 is a vertical section representing the cistern and parts therewith connected during the time the cistern is filling gradually. Fig. 2 is a similar view with the water running out of the cistern, and Fig. 3 is an inverted sectional plan at the line $x$ $x$.

The cistern A is of a suitable size to contain the required quantity of water for each flushing operation, and within the same is a supply-cock, B, which is set to discharge continually the required quantity of water.

C is the flushing-pipe passing to the water-closet, and D is the rising portion of the siphon-pipe, and D' the descending portion of said siphon open at the lower end. Around this portion D of the siphon is a tube, E, that slides freely upon such siphon-pipe D, and the float F surrounds the tube E and is connected with the same, and this float F is closed at the upper end, except where the dam G extends above the same, and is open at its upper end, so that when the water rises above the top of this dam G it flows into the float, increasing the weight thereof and causing it to descend rapidly and the float to entirely fill with water.

The tube E extends below the float F, and there are perforations 2 through the sides of this tube E to admit water freely thereinto, and there is a valve, H, at the lower end of the tube E, above and within the screw-cap, I, so that when the float is raised by the action of the water the valve H closes the lower end of the siphon D; hence water does not pass into this siphon during the time that the float is raised by the action of the water, and it is preferable to provide a stud or screw upon the tube D and within a slot in the lower portion of the tube E, (see dotted lines at P,) to form a guide that prevents the tube E from rotating upon the tube D as the float F rises and falls.

Within the float F and overflow-dam G is a secondary siphon, K, which is made of a comparatively small tube, the lower end of which passes through the bottom of the float and is turned off horizontally and passes through the lower portion of the tube E, near the perforations 2.

The operation of this apparatus is as follows: As the water gradually accumulates in the cistern A, it rises and lifts the float F, and the valve H closes the open end of the siphon D D', and the water continues to accumulate until it rises above the top of the siphon and flows over the dam G into the float H and causes the same to sink and become entirely full of water. In so doing the valve H opens the siphon D D', and the water, being above the top of the same, fills the siphon instantly and causes it to run and flush the closet through the pipe C, and as the water is drawn out of the cistern and descends the secondary siphon K commences to act in consequence of its longest leg passing through the bottom of the float and opening in the same direction as the flow of the water that passes into the main siphon, and this secondary siphon draws the water out from the float F, emptying the same simultaneously with the descent of the water in the cistern A; hence this float F rises and the valve H again closes the siphon D until the accumulation of water in the cistern again causes it to overflow the dam G, and the operations are repeated.

This device is very reliable, and there is no possibility of water flowing gradually through the siphon as it runs into the cistern; hence the flushing operations are regular and voluminous, and the time occupied between one flushing operation and the next depends upon the speed with which the water is allowed to flow into the cistern.

I claim as my invention—

1. The combination, with the siphon D D', of the tube E, sliding freely upon the same and having openings 2 near the lower end thereof, the valve H, connected with the said tube and acting to close the lower end of the siphon, the float F, around and connected to the tube E and having an overflow-dam, G, and the secondary siphon K within the float and passing through the bottom thereof and opening through the tube E, substantially as set forth.

2. The combination, with the cistern for a water-closet and the flushing-pipe thereof, of a siphon-pipe within the cistern, a valve for closing the end of the siphon-pipe and a float for moving the said valve, and a secondary siphon connected with the float and opening at its lower end into the main siphon for discharging water out of the float, substantially as set forth.

Signed by me this 19th day of March, 1888.

JORDAN L. MOTT, Jr.

Witnesses:
E. CLINTON SMITH,
W. H. KNIGHT.